United States Patent
Arnold

(10) Patent No.: US 7,637,761 B1
(45) Date of Patent: Dec. 29, 2009

(54) METHOD AND APPARATUS TO CONNECT A WIRING HARNESS TO AN ELECTRIC MACHINE

(75) Inventor: Darnel Arnold, Detroit, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/189,341

(22) Filed: Aug. 11, 2008

(51) Int. Cl.
*H01R 4/60* (2006.01)

(52) U.S. Cl. .................................... 439/212
(58) Field of Classification Search ........... 439/212, 439/752, 585
See application file for complete search history.

(56) References Cited

U.S. PATENT DOCUMENTS

| | | | |
|---|---|---|---|
| 5,132,896 | A | 7/1992 | Nishizawa et al. |
| 6,024,589 | A | 2/2000 | Hahn, IV et al. |
| 6,547,572 | B1 * | 4/2003 | Burdick ............... 439/76.2 |
| 6,716,071 | B2 * | 4/2004 | Miyazaki ............... 439/859 |
| 6,755,664 | B2 * | 6/2004 | Sakamoto et al. ............. 439/49 |
| 6,921,292 | B2 * | 7/2005 | Miyazaki ............... 439/564 |
| 7,041,907 | B2 * | 5/2006 | Miyazaki ............... 174/72 A |
| 7,053,298 | B2 * | 5/2006 | Ikeda et al. ............... 174/50 |
| 7,059,918 | B2 * | 6/2006 | Matsumoto et al. ......... 439/752 |
| 7,097,498 | B2 * | 8/2006 | Miyazaki ............... 439/559 |
| 7,306,063 | B2 | 12/2007 | Morita et al. |
| 7,309,928 | B2 * | 12/2007 | Grant et al. ............... 290/1 A |
| 2003/0171042 | A1 * | 9/2003 | Miyazaki ............... 439/859 |
| 2004/0106325 | A1 * | 6/2004 | Miyazaki ............... 439/607 |
| 2004/0214464 | A1 * | 10/2004 | Fukushima et al. ......... 439/271 |
| 2007/0020997 | A1 * | 1/2007 | Miyakawa ............... 439/595 |
| 2008/0261414 | A1 * | 10/2008 | Mizutani et al. ............. 439/34 |

* cited by examiner

*Primary Examiner*—T C Patel
*Assistant Examiner*—Vladimir Imas

(57) ABSTRACT

A high voltage electric power wiring harness for supplying an electric machine runs substantially parallel to a frame. Terminal ends of a plurality of wiring cables are staggered in length, height and depth. Terminal ends are coupled to bus bars which project through the frame and fasten to surfaces of a terminal block corresponding in height to the respective heights of the terminal ends of the wire cables. The bus bars mechanically fasten with and electrically connect to conductors of the electric machine.

18 Claims, 5 Drawing Sheets

METHOD AND APPARATUS TO CONNECT A WIRING HARNESS TO AN ELECTRIC MACHINE

TECHNICAL FIELD

This disclosure is related to an electric power connector for a powertrain system employing an electric machine.

BACKGROUND

Packaging envelopes for electric circuits supplying electric power to electric machines on vehicles can be limited. Implementation of large capacity electrical systems can be constrained by available packaging space. An example of a large capacity electrical circuit is an electric circuit conducting high voltage electric power between an inverter device and a traction motor. Known design factors of a large capacity electrical circuit include length and routing of high power electric cables based upon electrical energy losses, inductance and electrical noise generation, temperature management and dissipation, and accessibility for assembly and service.

SUMMARY

A high voltage electric power wiring harness is coupled to an electric machine operative to generate tractive power in a vehicle. The wiring harness includes first, second and third wire cables having respective longitudinal axes parallel to a frame and having respective terminal ends staggered in length and height relative to the frame. The terminal ends may also be staggered with respect to depth relative to the frame. First, second, and third bus bars are attached to the respective terminal ends of the first, second and third wire cables and project orthogonally from the respective longitudinal axes toward the frame. The first, second, and third bus bars pass through openings in the frame. Distal ends of the first, second, and third bus bars are fastened to first, second, and third surfaces of a terminal block which is fixedly attached to the frame. The first, second, and third surfaces of the terminal block correspond in height to the respective heights of the first, second, and third terminal ends of the wire cables. The first, second, and third bus bars mechanically fasten with and electrically connect to corresponding first, second and third electric conductors of the electric machine.

BRIEF DESCRIPTION OF THE DRAWINGS

One or more embodiments will now be described, by way of example, with reference to the accompanying drawings, in which.

DETAILED DESCRIPTION

Figure 1:
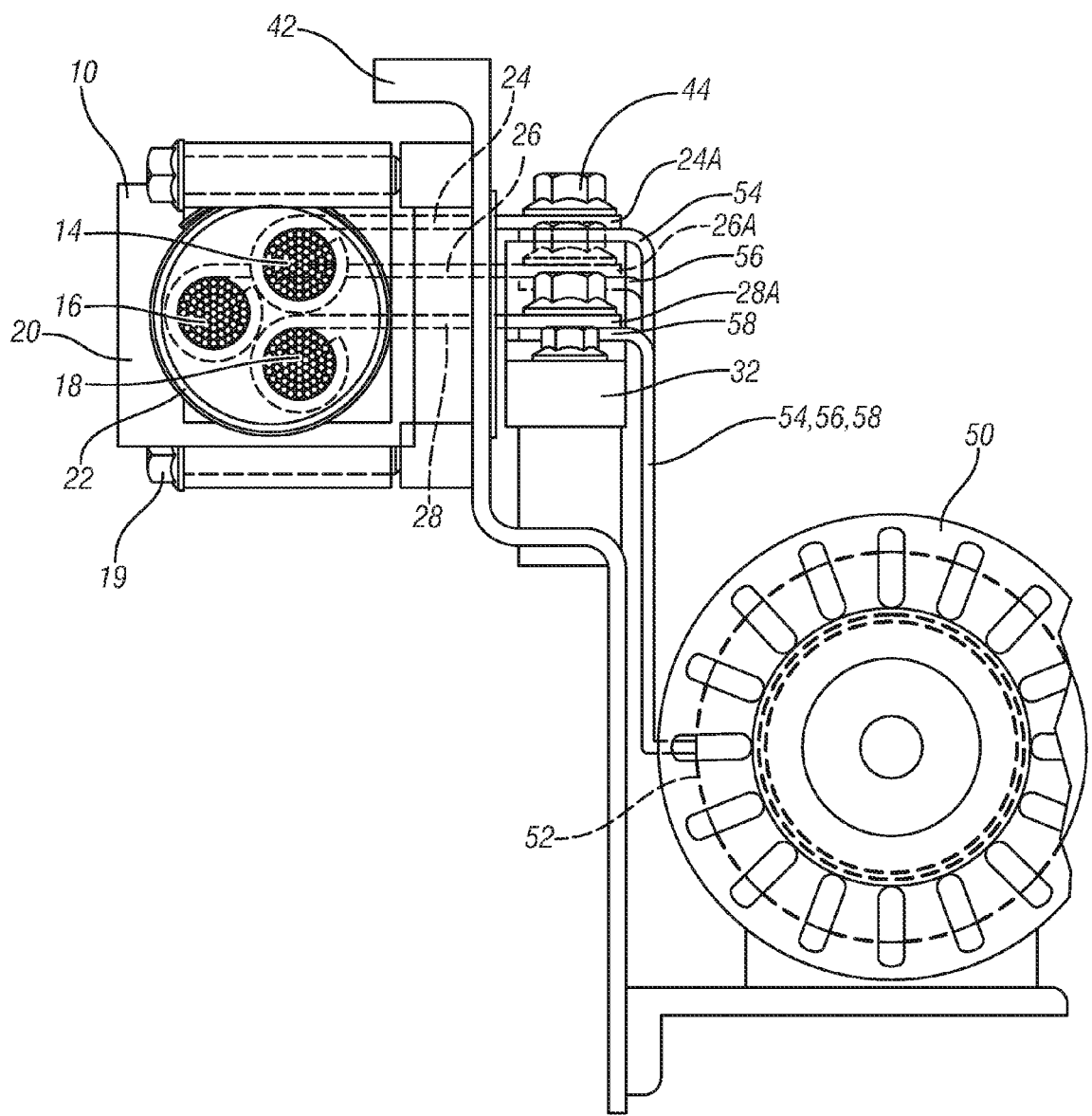
FIG. 1 is a two-dimensional side view schematic diagram, in accordance with an embodiment of the present disclosure.
Figure 2:
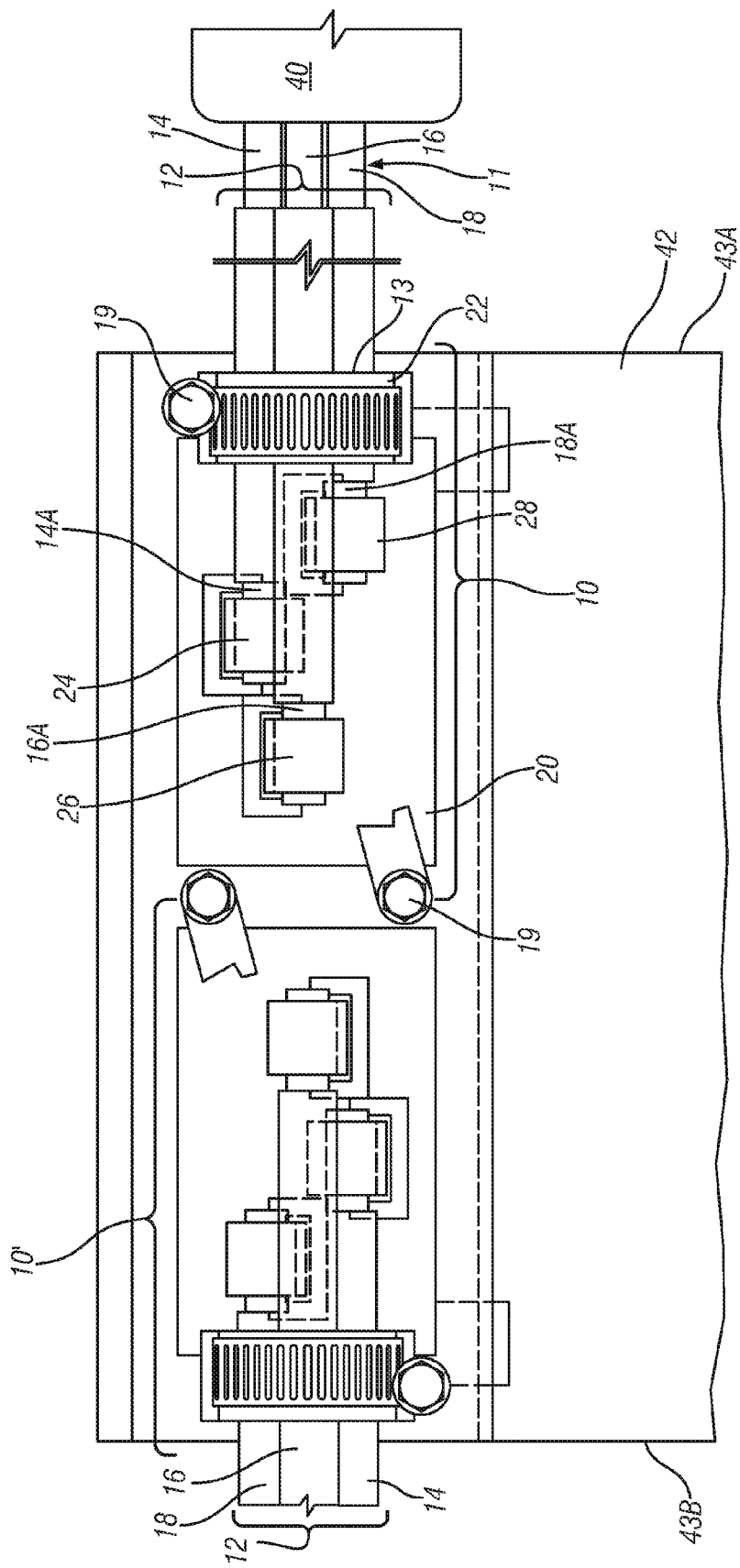
FIG. 2 is a two-dimensional front view schematic diagram, in accordance an embodiment of the present disclosure.
Figure 3:
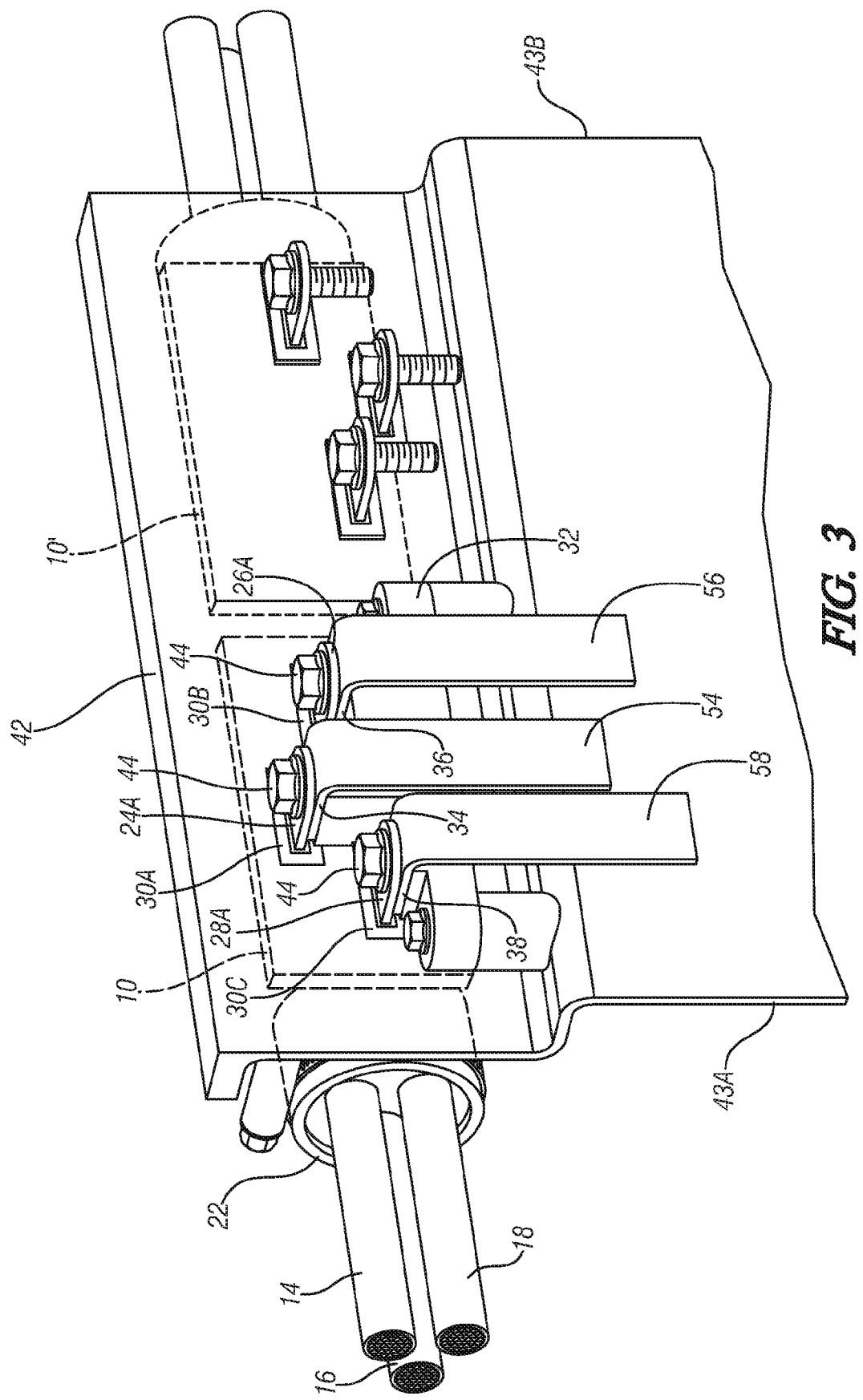
FIG. 3 is a three-dimensional back view schematic diagram, in accordance an embodiment of the present disclosure.

Referring now to the drawings, wherein the showings are for the purpose of illustrating certain exemplary embodiments only and not for the purpose of limiting the same, FIGS. 1, 2, and 3 schematically illustrate two connection systems 10, 10' in accordance with an embodiment of the disclosure. Like numerals refer to like elements in the embodiments. Each of the connection systems 10, 10' electrically connects an inverter 40 to a wiring harness 12 that connects to a stator 52 of an electric machine 50 that is housed in a frame 42. In the embodiments shown in FIGS. 1-5 there are two electric machines 50 housed in the frame 42. The wiring harness 12 for the first connection system 10 approaches the frame 42 from a first side 43A and the wiring harness 12 for the second connection system 10' approaches the frame 42 from a second side 43B that is opposite to the first side 43A. Each wiring harness 12 is preferably constructed of three electrically insulated wire cables 14, 16 and 18, each preferably formed from copper and capable of conducting high voltage electric power, e.g., 300 volts at 200 amps or 60 kW of electric power, between an electric power inverter 40 and the electric machine 50.

Perspectives of length, height, and depth are defined in FIG. 1 relative to the wire cables 14, 16 and 18 with reference to the frame 42 of the electric machine 50, with the length defined along a longitudinal axis of the wire cables 14, 16 and 18, the height defined as perpendicular to the longitudinal axis of the wire cables 14, 16 and 18 and projecting vertically, and the depth defined as perpendicular to the longitudinal axis of the wire cables 14, 16 and 18 and projecting horizontally.

Each of the wire cables 14, 16 and 18 electrically connects to an electrical connector (not shown) of the inverter 40, e.g., an electrical outlet of an electric power device such as an insulated gate bipolar transistor (not shown) of the inverter 40 at a first end 11 of the wiring harness 12. A cover 20 encloses the wire cables 14, 16 and 18 at a second end 13 of the wiring harness 12 contiguous to the frame 42. The cover 20 fixedly attaches to the frame 42 of the electric machine 50 by way of bolts 19 which connect to the frame 42. The frame 42 comprises a rigid structure encasing the electric machine 50. Longitudinal axes of the wire cables 14, 16 and 18 are parallel to a planar surface of the frame 42. The cover 20 includes a collar 22 which circumscribes and fixedly conjoins the electrically insulated wire cables 14, 16 and 18. The cover 20 including collar 22 encases the second end 13 of the wiring harness 12 and environmentally seals the second end to the frame 42. The heights of the wire cables 14, 16 and 18 are staggered relative to the frame 42, with the first wire cable 14 at a first predetermined height, and preferably placed directly over the third wire cable 18 which is at a third predetermined height. The second wire cable 16 is at a second predetermined height intermediate between the first wire cable 14 and the third wire cable 18. The depths of the wire cables 14, 16 and 18 relative to the frame 42 are staggered. The first and third wire cables 14 and 18 are preferably at a first predetermined depth and the second wire cable 16 at a second predetermined depth relative to the frame 42.

The wire cables 14, 16, and 18 have respective non-insulated and exposed terminal ends 14A, 16A, and 18A that are longitudinally staggered relative to the frame 42. The exposed terminal ends 14A, 16A, and 18A are staggered longitudinally such that there is no overlap, i.e., the first and second wire cables 14 and 16 that are adjacent to the exposed terminal ends 14A and 18A are electrically isolated therefrom. First, second, and third bus bars 24, 26 and 28 fixedly attach to the respective exposed terminal ends 14A, 16A, and 18A of the first, second and third wire cables 14, 16, and 18, projecting orthogonally from the longitudinal axis thereof toward the frame 42. The first, second, and third bus bars 24, 26 and 28 each comprises a flat plate conductor device constructed of copper or copper alloy materials having an ampere capacity sufficient to conduct the high voltage electric power between the inverter 40 and the electric machine 50. The design of each of the bus bars 24, 26, and 28 including material, plate thickness, and spacing therebetween is preferably determined based upon criteria including the ampere capacity, electrical inductance, thermal management, and configured to fit into available space.

The frame 42 has three slotted openings 30a, 30b, and 30c for each of the connection systems 10, preferably staggered in height and in length, through which the bus bars 24, 26, and 28 pass. Each of the slotted openings 30a, 30b, and 30c is electrically isolated from the frame 42 and hermetically sealed to prevent permeation of gases, liquids and solid particles therethrough. A terminal block 32 is attached to the frame 42 inside the electric machine 50, preferably adjacent to the slotted openings 30a, 30b, and 30c. The terminal block 32 is formed from non-conductive, electrically insulative material, and has first, second and third surfaces 34, 36, and 38 preferably oriented at staggered heights corresponding to the staggered heights of the slotted openings 30a, 30b, and 30c. Distal ends 24A, 26A, and 28A of the first, second, and third bus bars 24, 26, and 28 are mechanically fastened to corresponding first, second, and third surfaces 34, 36, and 38 of the terminal block 32 via one of the fasteners 44.

First, second and third electric conductors 54, 56, and 58 mechanically fasten to the corresponding first, second, and third surfaces 34, 36, and 38 of the terminal block 32 and mechanically fasten with one of the bus bars 24, 26, and 28 via the one of the fasteners 44. The first, second and third electric conductors 54, 56, and 58 electrically connect the bus bars 24, 26, and 28 to individual poles (not shown) of the stator 52 of the electric machine 50.

The electric machine 50 of the embodiments preferably comprises a three-phase electric motor/generator unit operative to generate mechanical power from the transmitted electric power for tractive power in a vehicle (not shown), and operative to generate electric power from kinetic energy from the vehicle.

Figure 4:
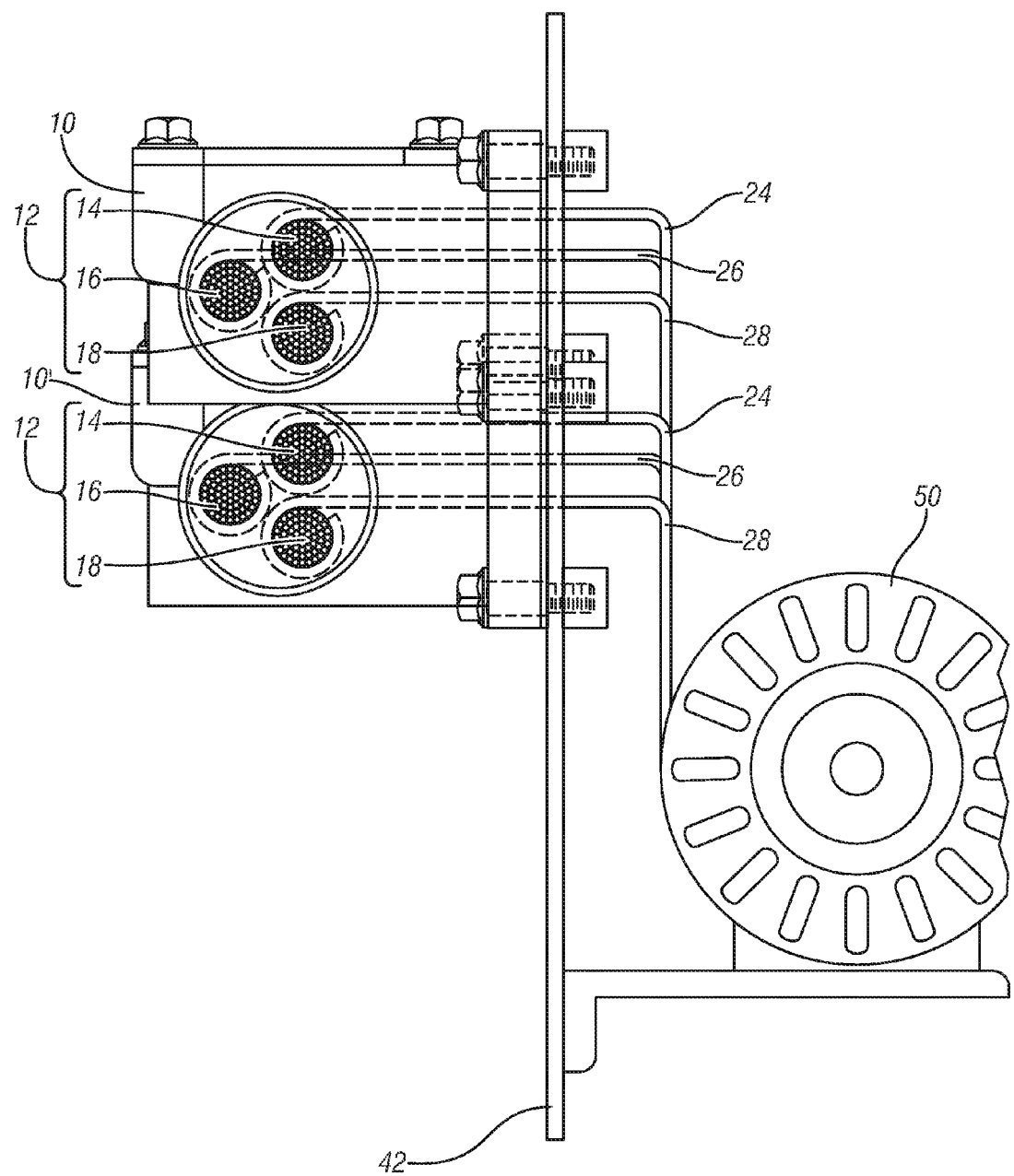
FIG. 4 is a two-dimensional side view schematic diagram, in accordance an embodiment of the present disclosure.
Figure 5:
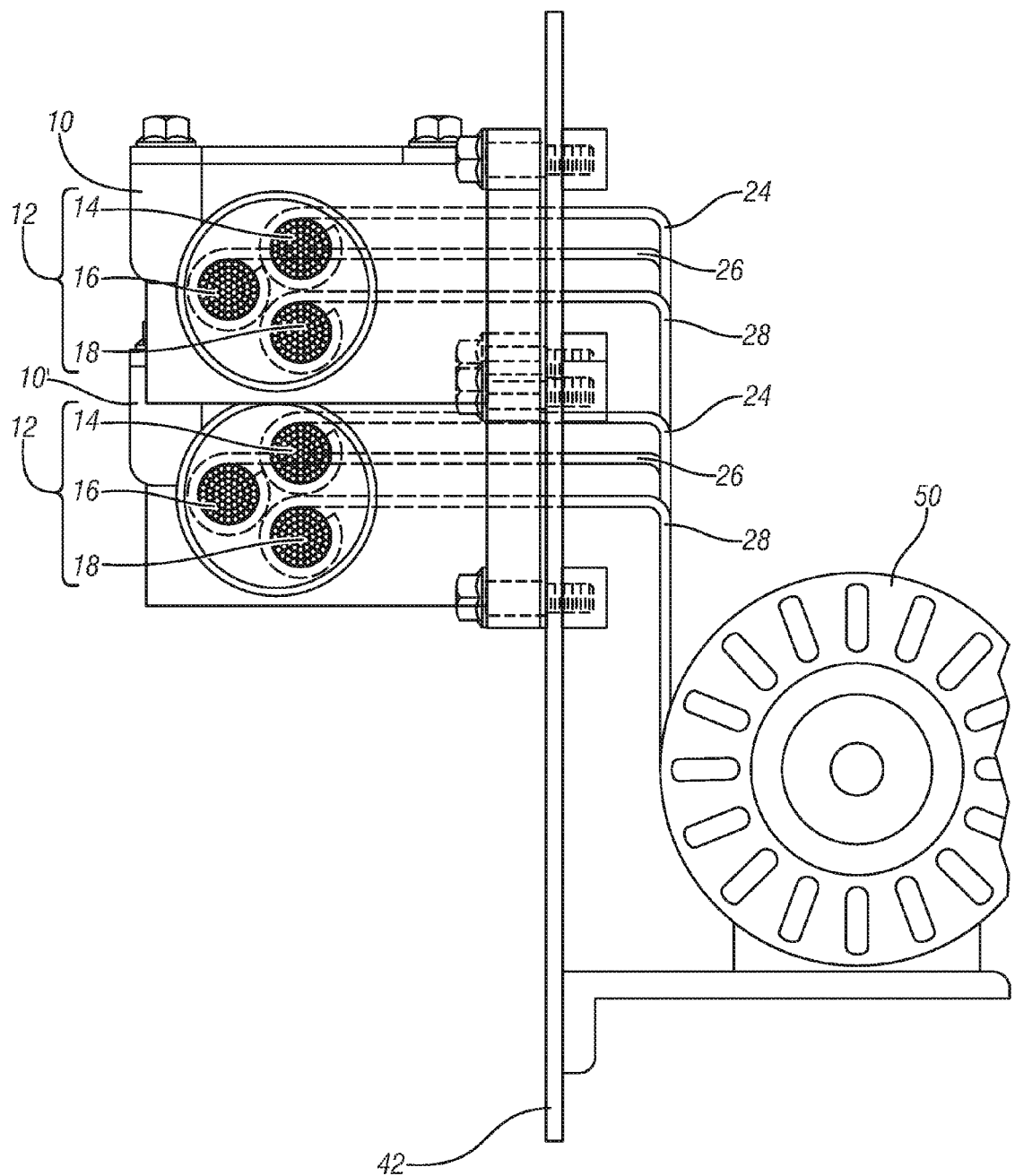
FIG. 5 is a two-dimensional front view schematic diagram, in accordance an embodiment of the present disclosure.

FIGS. 4 and 5 schematically show the two connection systems 10, 10' in accordance with a second embodiment of the disclosure. Like numerals refer to like elements. In this embodiment, the wiring harness 12 for the first connection system 10 and the wiring harness 12 for the second connection system 10' both approach the frame 42 from the first side 43A. The heights of the connection systems 10, 10' are staggered relative to the frame 42, and the depths of the connection systems 10, 10' are preferably the same relative to the frame 42. Each wiring harness 12 is preferably constructed of three electrically insulated wire cables 14, 16 and 18, each preferably formed from copper and capable of conducting the high voltage electric power between the inverter 40 and the electric machine 50.

Other embodiments (not shown) may include a single electric machine 50 housed in the frame 42, or three or more electric machines 50 housed in the frame 42, with a corresponding quantity of connection systems 10, each including a wiring harness 12 wherein the longitudinal axis of each of the wiring harnesses 12 is parallel to the surface of the frame 42. The wiring harnesses may approach the frame 42 from either of the first side 43A and second side 43B, or from any direction and parallel to the surface of the frame 42.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Apparatus for coupling a high voltage electric power wiring harness to an electric machine operative to generate tractive power in a vehicle, comprising:
    the wiring harness including first, second and third wire cables having respective longitudinal axes parallel to a frame and having respective terminal ends staggered in length and height relative to the frame;
    first, second, and third bus bars attached to the respective terminal ends of the first, second and third wire cables and projecting orthogonally from said respective longitudinal axes toward the frame;
    the first, second, and third bus bars passing through openings in the frame;
    distal ends of the first, second, and third bus bars fastened to first, second, and third surfaces of a terminal block fixedly attached to the frame;
    the first, second, and third surfaces of the terminal block corresponding in height to the respective heights of the first, second, and third terminal ends of the wire cables; and
    the first, second, and third bus bars mechanically fastened with and electrically connected to corresponding first, second and third electric conductors of the electric machine.

2. The apparatus of claim 1, wherein each of the openings through the frame hermetically seal around the respective bus bar and electrically isolate the respective bus bar from the frame.

3. The apparatus of claim 2, wherein each of the first, second and third wire cables is electrically connected to an electric power inverter.

4. The apparatus of claim 3, wherein the first, second, and third surfaces of the terminal block are non-conductive.

5. The apparatus of claim 1 wherein said respective terminal ends are further staggered in depth relative to the frame.

6. The apparatus of claim 4, wherein the first terminal end is at a first predetermined height, the third terminal end is at a third predetermined height and the second terminal end is at a second predetermined height intermediate the first and third predetermined heights, relative to the frame of the electric machine.

7. The apparatus of claim 6, further comprising a cover attached to the frame and enclosing the terminal ends of the first, second and third wire cables.

8. The apparatus of claim 7, wherein the first, second and third wire cables conduct high voltage electric power to the electric machine.

9. The apparatus of claim 1, wherein each of the first, second and third wire cables is electrically connected to an electric power inverter.

10. The apparatus of claim 1, wherein the first terminal end is at a first predetermined height and a first predetermined depth, the second terminal end is at a second predetermined height and a second predetermined depth, and the third terminal end is at a third predetermined height and a third predetermined depth, relative to the frame of the electric machine.

11. The apparatus of claim 1, wherein the first terminal end is at a first predetermined height and a first predetermined depth, the second terminal end is at a second predetermined height and a second predetermined depth, and the third terminal end is at a third predetermined height and the first predetermined depth, relative to the frame of the electric machine.

12. The apparatus of claim 1, further comprising a cover hermetically sealably attached to the frame and enclosing the terminal ends of the first, second and third wire cables.

13. Method to connect a wiring harness to an electric machine to conduct high voltage electric power, comprising:
   providing a wiring harness including first, second and third wire cables having respective longitudinal axes parallel to a frame;
   staggering lengths and heights of respective terminal ends of the first, second and third wire cables relative to the frame;
   attaching respective first ends of first, second, and third bus bars to the respective terminal ends of the first, second and third wire cables;
   projecting the first, second, and third bus bars orthogonally from said respective longitudinal axes toward the frame;
   passing the first, second, and third bus bars through openings in the frame;
   fastening respective second ends of the first, second, and third bus bars to respective first, second, and third surfaces of a terminal block corresponding in height to the respective heights of the first, second, and third terminal ends of the wire cables; and,
   fastening and electrically coupling the respective second ends of the first, second, and third bus bars to corresponding first, second and third electric conductors of the electric machine.

14. The method of claim 13, comprising electrically isolating and hermetically sealing the openings through the frame.

15. The method of claim 14, comprising electrically isolating the wire cables adjacent to the terminal ends of the first, second and third wire cables.

16. Apparatus for connecting an electric power inverter to an electric machine to conduct high voltage electric power to generate mechanical power, comprising:
   an electric machine housed in a frame;
   a wiring harness including a plurality of wire cables having longitudinal axes parallel to a planar surface of the frame of the electric machine and having terminal ends staggered in length and height and depth relative to the frame;
   a plurality of bus bars having respective first ends attached to terminal ends of the plurality of wire cables and projecting orthogonally from the longitudinal axes thereof,
   the plurality of bus bars passing through hermetically-sealed, electrically-isolating, slotted openings in the frame corresponding to the staggered length and height of the plurality of wire cables;
   respective second ends of the plurality of bus bars fastened to respective ones of a plurality of surfaces of a terminal block fixedly attached to the frame;
   the wire cables electrically connected to an electric power inverter; and
   the plurality of bus bars fastened with and electrically coupled to corresponding ones of a plurality of electric conductors of the electric machine.

17. The apparatus of claim 16, further comprising:
   a second electric machine housed in the frame;
   a second electric power inverter electrically connected to the second electric machine to conduct high voltage electric power including a second wiring harness including a respective plurality of wire cables having longitudinal axes parallel to the planar surface of the frame; and
   wherein the wire cables of the first wiring harness approach the frame from a first side, and the wire cables of the second wiring harness approach the frame from a second side.

18. The apparatus of claim 16, further comprising:
   a second electric machine housed in the frame;
   a second electric power inverter electrically connected to the second electric machine to conduct high voltage electric power including a second wiring harness including a respective plurality wire cables having longitudinal axes parallel to the planar surface of the frame; and
   wherein the wire cables of the first wiring harness and the wire cables of the second wiring harness approach the frame from a first side.

* * * * *